US007333922B2

(12) United States Patent
Cannon

(10) Patent No.: US 7,333,922 B2
(45) Date of Patent: Feb. 19, 2008

(54) SYSTEM AND METHOD OF MONITORING MACHINE PERFORMANCE

(75) Inventor: Robert Kimball Cannon, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/092,612

(22) Filed: Mar. 30, 2005

(65) Prior Publication Data

US 2006/0229851 A1 Oct. 12, 2006

(51) Int. Cl.
*G06F 15/00* (2006.01)

(52) U.S. Cl. .......................... 702/193; 701/33; 701/50; 700/29; 700/30; 700/108

(58) Field of Classification Search .................. 702/56, 702/181, 182, 184, 193, 196; 701/33, 50; 700/29, 30, 108
See application file for complete search history.

(56) References Cited

U.S. PATENT DOCUMENTS 4,752,950 A * 6/1988 Le Carpentier ........ 379/106.11
5,710,723 A * 1/1998 Hoth et al. ................ 702/181
5,734,569 A * 3/1998 Rogers et al. ................ 701/33
5,737,215 A * 4/1998 Schricker et al. ............ 700/29
5,854,994 A * 12/1998 Canada et al. ................ 702/56
5,864,781 A * 1/1999 White ........................ 702/182
5,901,806 A * 5/1999 Takahashi .................. 180/170
5,907,491 A * 5/1999 Canada et al. ............. 700/108
6,324,659 B1 11/2001 Pierro
6,671,614 B2 12/2003 Weisman, II et al.
6,745,151 B2 6/2004 Marko et al.
6,745,153 B2 * 6/2004 White et al. ............... 702/184
2002/0059075 A1 5/2002 Schick et al.
2002/0184178 A1 12/2002 Tasoojl et al.
2003/0055666 A1 3/2003 Roddy et al.
2004/0078171 A1 4/2004 Wegerich et al.
2005/0085973 A1 * 4/2005 Furem et al. ................ 701/50

* cited by examiner

*Primary Examiner*—Carol S. W. Tsai
(74) *Attorney, Agent, or Firm*—Finnegan, Henderson, Farabow, Garrett & Dunner

(57) ABSTRACT

A method of monitoring machine operation includes sensing an operating characteristic of a plurality of machines and calculating a performance metric. The performance metric is indicative of the operating characteristic of at least a portion of the plurality of machines. The method also includes storing the performance metric and comparing the performance metric to at least one other stored performance metric.

26 Claims, 3 Drawing Sheets

SYSTEM AND METHOD OF MONITORING MACHINE PERFORMANCE

TECHNICAL FIELD

The present disclosure relates generally to systems and methods of monitoring machine performance and, more particularly, to systems and methods of monitoring the performance of multiple machines.

BACKGROUND

Many methods of monitoring vehicle performance currently exist. Some of these methods utilize an approach in which operating characteristics of a number of vehicles in a fleet are monitored. The data collected may be manipulated to form a single metric representative of the monitored vehicles. The measured operating characteristic of each vehicle may then be compared to the single metric to assist in evaluating the particular vehicle with respect to the entire fleet.

For example, U.S. Pat. No. 5,737,215 ("the '215 patent") describes a method for comparing the characteristics of a vehicle in a fleet to the characteristics of the fleet as a whole. The method of the '215 patent includes sensing characteristics of each vehicle and determining a set of reference data. The method further includes comparing the sensed characteristics of one of the vehicles with the reference data and responsively producing a deviation signal for vehicles having sensed characteristics outside of a predetermined threshold for the particular characteristic.

Although the system of the '215 patent may monitor operating characteristics of a vehicle with respect to other vehicles in the fleet, for a particular application, the system may not enable an operator to evaluate the fleet as it performs the application repeatedly over time. The system may not identify a change in the calculated fleet metric over time and, thus, may not enable a user to evaluate the gradual effects of environmental and/or other factors on fleet performance.

The system of the present disclosure is directed to overcoming one or more of the problems set forth above.

SUMMARY OF THE INVENTION

In one embodiment of the present disclosure, a method of monitoring machine operation includes sensing an operating characteristic of a plurality of machines and calculating a performance metric. The performance metric is indicative of the operating characteristic of at least a portion of the plurality of machines. The method also includes storing the performance metric and comparing the performance metric to at least one other stored performance metric.

In still another embodiment of the present disclosure, a machine performance evaluation system is provided for evaluating the performance of machines in a fleet including a plurality of machines. Each of the machines includes at least one sensor configured to sense an operating characteristic of the machine. Each of the machines also includes a controller configured to accept information from the at least one sensor. The system further includes a receiver configured to receive information from the plurality of machines and a central processor configured to receive information from one of the machines or the receiver. The central processor is configured to calculate a performance metric indicative of the operating characteristic of at least a portion of the plurality of machines. The central processor is also configured to store the performance metric and to compare the performance metric to at least one other previously stored performance metric indicative of the same operating characteristic as the performance metric.

In a further embodiment of the present disclosure, a method of monitoring machine operation includes sensing an operating characteristic of a plurality of work machines and calculating a performance metric. The performance metric is indicative of the operating characteristic of at least a portion of the plurality of work machines. The method also includes storing the performance metric and comparing the performance metric to at least one other stored performance metric.

DETAILED DESCRIPTION

Figure 1:
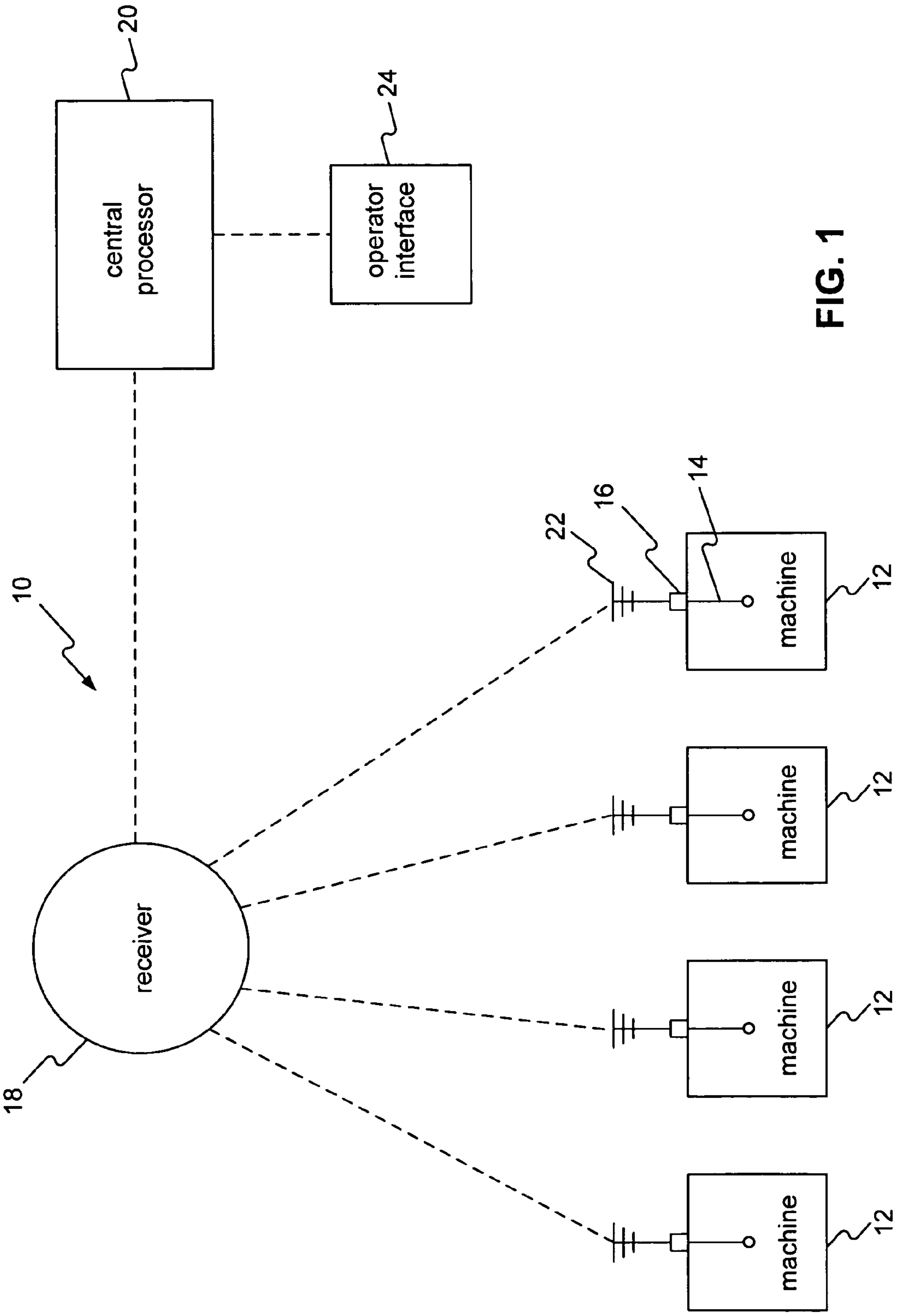
FIG. 1 is a schematic illustration of a monitoring system according to an exemplary embodiment of the present disclosure.

As shown in FIG. 1, a system 10 of the present disclosure may include a number of machines 12. Each of the machines 12 may include a sensor 14 in communication with a controller 16. The system 10 may further include a receiver 18 in communication with each of the machines 12. The receiver 18 may also be in communication with a central processor 20.

The machines 12 of the present disclosure may be any type of vehicle and/or work machine known in the art, such as, for example, on-road or off-road vehicles. Together, like machines 12 may form a fleet useful in performing a variety of conventional applications. Such machines 12 may include, but are not limited to, wheel dozers, wheel loaders, track loaders, skid steer loaders, backhoe loaders, compactors, forest machines, front shovels, hydraulic excavators, integrated tool carriers, multiterrain loaders, material handlers, and agricultural tractors. Such machines 12 may be powered by, for example, a diesel, gasoline, turbine, lean-burn, or other combustion engine known in the art.

Such machines 12 may also include a variety of work tools useful in accomplishing a desired application. In general, work tools may be divided into two categories: those capable of performing a single application and those capable of performing more than one application. Such so-called "single-application" work tools may include, but are not limited to, trenching tools, material handling arms, augers, brooms, rakes, stump grinders, snow blowers, wheel saws, de-limbers, tire loaders, and asphalt cutters. Likewise, "multi-application" tools may include, but are not limited to, buckets, angle blades, cold planers, compactors, forks, landscape rakes, grapples, backhoes, hoppers, multi-processors, truss booms, and thumbs. It is understood that the work tools attached to the machines 12 of the present disclosure may be either a single-application or a multi-application work tool. It is understood that aspects of the present disclosure may be used with other machines not described herein, and the present disclosure is not intended to be limited to the types of vehicles and/or machines described above.

Each of the machines 12 and/or work tools described above may further include a variety of hydraulic and/or nonhydraulic components (not shown) useful in performing a desired application. For example, each machine 12 may include an engine, pumps, cooling fans, radiators, hydraulic cylinders, articulating members, and/or other components configured to operate and/or power the machine, and/or actuate a work tool (not shown) connected to the machine 12. It is understood that each machine 12 and/or work tool may further include other conventional components not mentioned above to assist in performing the desired application.

As noted above, a sensor 14 may be connected to each of the machines 12 and/or work tool components described above. The sensor 14 may be, for example, a temperature sensor, pressure sensor, position sensor, flow sensor, and/or other sensor capable of sensing machine operating characteristics. It is understood that as used herein, the term "operating characteristics" may include engine temperature, engine speed, fluid temperature, fluid flow rate, fluid pressure, exhaust flow, exhaust temperature, run time, and/or other measurable machine properties known in the art. It is also understood that the fluids measured may be fuel, oil, hydraulic fluid, coolant, and/or any other working fluid known in the art. The sensor 14 may have multiple capabilities. For example, in addition to detecting engine temperature, the sensor 14 may also be capable of measuring engine speed. Alternatively, each machine 12 may include a number of different sensors 14 configured to sense various operating characteristics of the machine 12. The sensors 14 may be located anywhere on the machine 12 depending on, for example, the sensor's size, shape, type, and function. For example, in an embodiment in which a first sensor 14 is used to detect engine temperature and a second sensor 14 is used to detect hydraulic fluid pressure, the first sensor 14 may be connected to a housing of the engine and the second sensor 14 may be connected to a hydraulic cylinder of the machine 12.

Each sensor 14 may be in communication with the controller 16. The controller 16 may be, for example, an electronic control module, a processing unit, a laptop computer, or any other control device known in the art. The controller 16 may receive input from a variety of sources in addition to the sensors 14 mentioned above, such as, for example, the operator of the machine 12. In an exemplary embodiment, each machine 12 may further include a number of operator interfaces (not shown) in the operator's cockpit through which the controller 16 may receive input from the operator. The controller 16 may be capable of processing inputs using a number of preset algorithms and/or conventional statistical functions. The controller 16 may also use the inputs to form a control signal based on the algorithms. The control signal may be transmitted from the controller 16 to one or more of the components of the machine 12. Thus, controller 16 may generally be configured to control the machine 12 and, more particularly, the controller 16 may be configured to control each of the components of the machine 12. The controller 16 may also be capable of storing the data received from the sensors 14. The stored data may be uploaded and/or downloaded locally and/or remotely by any conventional means.

As mentioned above, the controller 16 of each machine 12 may be in communication with the receiver 18. Communication between the controller 16 and the receiver 18 may be accomplished by any conventional means and it is understood that the receiver 18 may be remote from the machine 12. In an exemplary embodiment of the present disclosure, the controller 16 may include a transmitter 22. The transmitter 22 may be configured to send and/or receive signals containing operating characteristic information. The transmitter 22 may utilize, for example, a radio, telephone, Internet, or other transmittal device capable of sending and/or receiving signals in a wireless and/or hard-wired format.

As shown schematically in FIG. 1, the receiver 18 may be configured to receive signals from, for example, each machine 12 and, more particularly, each transmitter 22. The receiver 18 may also be configured to send data from, for example, each machine 12 to the central processor 20. In an exemplary embodiment of the present disclosure, the receiver 18 may be a satellite in an orbit around the earth. Alternatively, in an embodiment in which the controller 16 and/or the transmitter 22 is configured to transmit information to the central processor 20 directly, the receiver 18 may be omitted.

The central processor 20 may be configured to receive signals from, for example, the receiver 18 and/or the machines 12 of the fleet. The central processor 20 may be located local to the machines 12 or, alternatively, the central processor 20 may be located remotely. The central processor 20 may be any type of computer, workstation, processor, or other type of data processing device known in the art, and may be configured to process data corresponding to sensor output. In an exemplary embodiment of the present disclosure, a preset algorithm, statistical model, and/or other conventional statistical function may be performed by the central processor 20.

Output from the central processor 20 may be, for example, stored in a database and retrieved for analysis as desired. Output may also be displayed by the central processor 20 by any conventional means and in any conventional way. For example, in an embodiment of the present disclosure, the central processor 20 may produce a histogram or other graphical illustration of the output. Such an illustration may be displayed via an operator interface 24, such as, for example, a monitor. It is understood that the operator interface 24 may further include a keyboard, mouse, and/or other conventional interface devices. The central processor 20 may also display output in a printed form through, for example, a printer (not shown). It is understood that output from the central processor 20 may also be, for example, transmitted and/or downloaded by any conventional means.

INDUSTRIAL APPLICABILITY

A system 10 of the present disclosure may be used to monitor various operational characteristics of a number of machines 12 in, for example, a machine fleet. The operational characteristics monitored may be indicative of machine performance, and the machines 12 monitored may be the same or of like types or models. The system 10 may facilitate the sensing of an operational characteristic of each of the machines 12. After, for example, a single sampling of data, the system 10 may facilitate communication of the sensed data between each of the machines 12 and a central processor 20 useful in, for example, manipulating, storing, and/or reporting the data. The processed data may be used by an operator for prognostic or other purposes.

The disclosed monitoring system 10 may be used to monitor the performance of a number of machines 12 relative to each other during the performance of an application. As mentioned above, the system 10 may be used with any type of vehicle and/or work machine known in the art. Moreover, the applications capable of being performed by the machines may include, but are not limited to, stockpiling, trenching, hammering, digging, raking, grading, moving pallets, material handling, snow removal, tilling soil, demolition work, carrying, cutting, backfilling, and sweeping. Thus, the disclosed system 10 may be used in conjunction with any work machine, on-road vehicle, or off-road vehicle known in the art, and aspects of machine performance may be monitored during any application known in the art. An exemplary method of monitoring machine performance during an application will now be described in detail.

In an exemplary embodiment, the system 10 may be used to monitor a fleet of machines 12 engaged in digging a trench. In such an application, the machines 12 may be, for example, skid steer loaders, and a work tool such as, for example, a trencher may be attached to a front end of each machine 12. The system 10 may be activated by the machine operator or by an operator monitoring the machines 12 remotely. Alternatively, the system 10 may be activated automatically upon machine start-up or commencement of the application.

Figure 2:
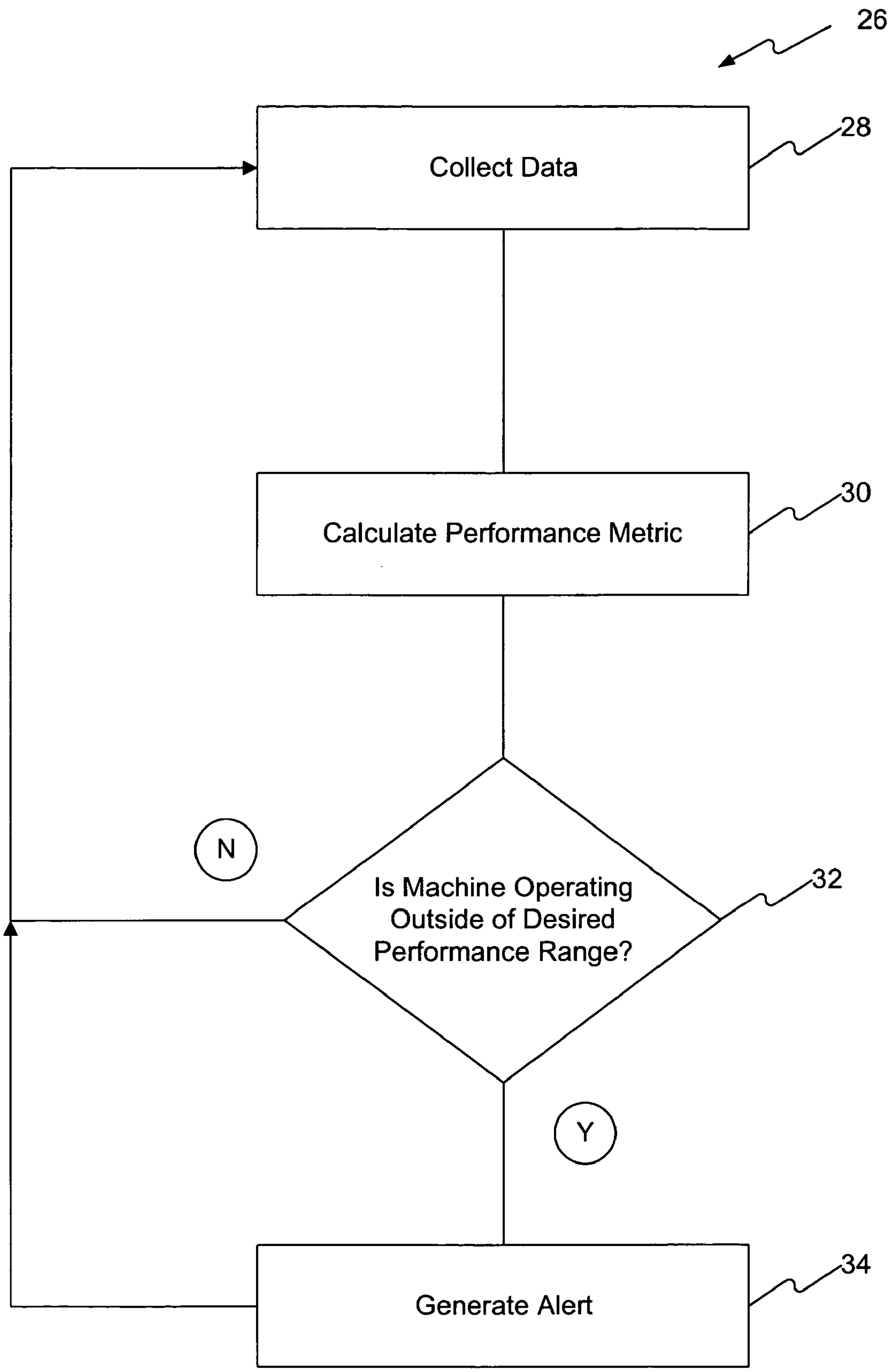
FIG. 2 is a flow chart of a monitoring strategy according to an exemplary embodiment of the present disclosure.

FIG. 2 illustrates a monitoring strategy flow chart 26 according to an exemplary embodiment of the present disclosure. Although not explicitly depicted in FIG. 2, the controller 16 may collect data from one or more of the sensors 14 (FIG. 1) and/or operator interfaces (not shown) located on the machine 12 (step 28). The data collected may correspond to operating characteristics of each of the machines 12 in the fleet. For example, in an embodiment in which a fleet of skid steer loaders are being used to dig a trench, the sensors 14 may be, for example, engine temperature sensors configured to sense the temperature of each machine engine. In such an embodiment, the controller 16 may collect engine temperature data and may process the data in any desirable way. The operating characteristics sensed may be related to machine performance. The controller 16 may use, for example, a number of preset algorithms and/or other conventional statistical methods to process the data into a desirable form. The controller 16 may also save the data in an internal database or other memory device.

The controller 16 may transmit the single sample of collected data, in processed or unprocessed form, to the central processor 20. The controller 16 may include a transmitter 22 to facilitate the transfer of data, and the data may be sent through a receiver 18 configured to relay such data. The central processor 20 may be positioned in a remote location relative to the machines 12 being monitored. As used herein, the phrase "a remote location" refers to any location different than the geographic location of the machines 12. Such a location may be, for example, a location different than the job site and may be anywhere in the world relative to the machines 12. It is understood that the receiver 18 may facilitate communication between the machines 12 and such a remote central processor 20.

After receiving the single sample of data, the central processor 20 may calculate a performance metric (step 30) indicative of an operating characteristic of at least a portion of the fleet of machines 12. As used herein, the term "performance metric" means any value or range of values formed from data collected from a number of machines. It is understood that such performance metrics may be formed through, for example, any statistical, arithmetic, and/or other technique. The performance metric may be, for example, an arithmetic mean of the data collected. The operating characteristic may be, for example, engine temperature, engine pressure, engine speed, fluid pressure, fluid flow rate, fluid temperature, and/or tool speed. It is understood that the operating characteristic may also be other conventional characteristics of machine operation known in the art. The central processor 20 may utilize a number of preset algorithms and/or statistical methods to calculate the performance metric, and the metric may represent an aspect of the fleet's performance. The central processor 20 may also store the performance metric for future analysis.

Figure 3:
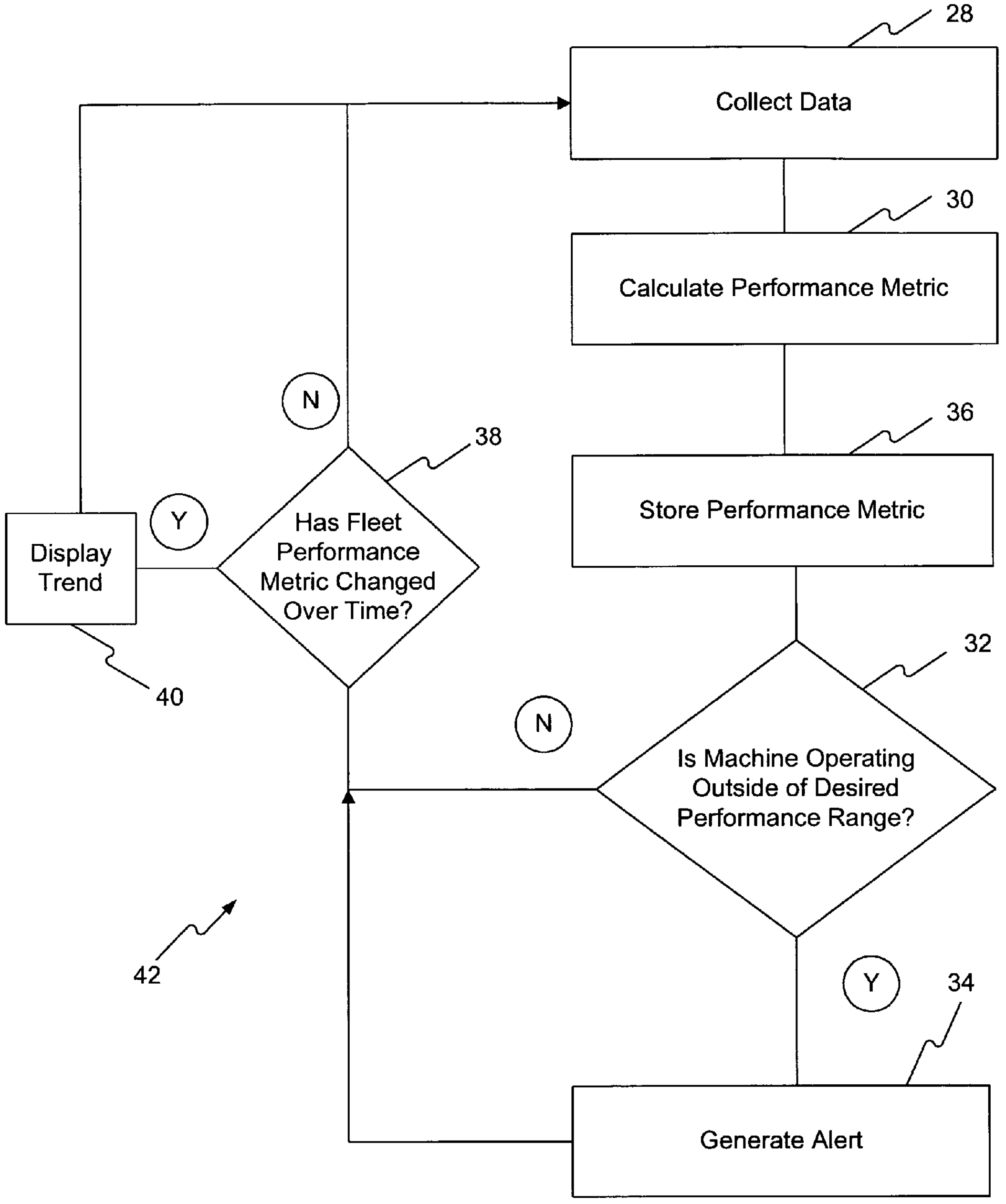
FIG. 3 is a flow chart of a monitoring strategy according to another exemplary embodiment of the present disclosure.

For example, in an exemplary embodiment of the present disclosure, stored performance metrics may be used in trending analysis, standard deviation analysis, and/or histogram formation. In such an embodiment, a fleet of machines 12 may be used to perform a long term application such as, for example, a large digging or excavation project. Such an application may take, for example, several months to complete. As illustrated in the monitoring strategy flow chart 42 shown in FIG. 3, the system 10 of the present disclosure may sense, for example, engine temperature or other operating characteristics of the machines 12 in the fleet during operation (step 28), and the central processor 20 may calculate, for example, an average engine temperature or other performance metric representative of the fleet (step 30). As explained above with respect to FIG. 2, it is understood that the system 10, machines 12, central processor 20, and other components referred to with respect to FIG. 3 are shown schematically in FIG. 1.

The central processor 20 may store the calculated performance metric (step 36) and may create a database containing at least a portion of the performance metrics calculated during a particular work shift. Performance metrics calculated in future shifts may be added and/or otherwise stored in the database such that the database may contain fleet performance metric data obtained throughout the long term application. This stored performance metric data may be charted, manipulated, and/or otherwise analyzed using conventional analytical techniques to evaluate aspects of the performance of the fleet as a whole over time and to determine whether the performance metric of the fleet has changed over time (step 38). In this example, such a method may be useful in detecting, for example, a change in the average engine temperature of the fleet over the course of the digging application and/or other performance metric trends. Fleet information gleaned from such trend analysis may, for example, assist operators in making fleet management decisions in future long term digging applications and/or other applications. Such information may be displayed (step 40) by any of the operator interfaces 24 discussed above and/or may be stored and recalled on demand.

Referring again to FIG. 2, it is understood that an embodiment of the present disclosure may assist in rapidly evaluating an aspect of machine performance. Calculating a performance metric after only a single sampling of operational characteristic data may assist in this rapid evaluation. In addition, sensing the operational characteristics of a number machines 12 in the fleet may facilitate the evaluation of each machine 12 with respect to the fleet as a whole. Such a method of evaluation may enable the operator to account for the effects of environmental factors and/or other factors known in the art on machine performance. For example, in an embodiment where tool speed data is collected during a grinding application, a decrease in tool speed may result when a machine 12 within a fleet is grinding a particularly dense piece of material. A monitoring method of the present disclosure may enable the operator to recognize that the tool speed of the machine 12 is low relative to other machines 12 in the fleet. Evaluating the machine 12 in such a way may assist the operator in determining the relative health of the machine 12 and/or the cause of the variation. If the particular machine 12 was the only machine 12 being sensed, a slower than normal tool speed may be accepted as a normal operating condition for the machine 12. Such a false normal operating condition may result in a false alert if the machine 12 was later used to grind a less dense piece of material and the tool speed dramatically increased.

The central processor 20 may also determine a desired operating characteristic range in response to the calculated performance metric. This desired range may be based on a known and/or preset parameter particular to the machines 12 in the fleet. For example, the machine operator may specify that during a trenching application, engine temperature should be maintained within one standard deviation of the mean engine temperature of the fleet of machines 12. After a single sensing of engine temperature, the central processor 20 may calculate the mean engine temperature of the machine fleet. Once this performance metric is calculated, the central processor 20 may determine a desired operating characteristic range based on a preset parameter of three standard deviations. In such an embodiment, the desired range may include engine temperatures that are within plus or minus three standard deviations of the calculated mean engine temperature of the fleet. It is understood that the desired range may change with each new sampling of data and, thus, with each new calculated mean and corresponding standard deviation for the data set. In this way, the system 10 may dynamically determine a desired range of operation for the machine fleet after each sampling of data.

Once a performance metric has been calculated (step 30), the central processor 20 may determine whether a particular machine 12 is operating outside of the desired operating characteristic range (step 32). In making this determination, the central processor 20 may compare the sensed operating characteristic of each machine 12 to the desired range. If a particular machine's operating characteristic is outside of the desired range (step 32: Yes), the central processor 20 may generate an alert (step 34). The alert may be any form of alert known in the art and may specifically identify the machine 12. For example, in an embodiment in which a machine's engine temperature is outside of a desired range for a particular fleet of machines 12, the central processor 20 may record machine identification, engine temperature, run time, and/or other data in a database or other memory device. Such saved data may be accessed, downloaded, transferred, or otherwise used for analysis purposes.

The central processor 20 may also generate a visual and/or audible alert through an operator interface 24 (FIG. 1). Such alerts may be useful in determining a preventative maintenance schedule for the machine 12. For example, if the sensed engine temperature of a particular machine 12 has been steadily increasing over a number of uses, the machine 12 may require maintenance. In addition, the alerts may be useful in determining aspects of the machine 12 in need of repair. For example, if a machine's engine temperature suddenly falls outside of the desired operating characteristic range, such an unexpected change in temperature may be indicative of a faulty thermocouple in the engine. It is understood that alerts may include a graphical display of related trend and/or histogram data, as well as text describing the cause of the alert and recommended actions.

As illustrated by FIG. 2, if a particular machine's operating characteristic is within the desired range (step 32: No), the central processor 20 may continue to collect data (step 28). Thus, in an exemplary embodiment of the present disclosure, the monitoring strategy of FIG. 2 may be a closed-loop strategy. It is understood that the system 10 may be shut down and/or discontinued by any conventional means.

As noted above, an embodiment of the present disclosure may be useful in monitoring the operation of both vehicles and work machines. With respect to work machines, it is understood that such machines 12 may be used in difficult to reach locations, such as, for example, pit mines, rain forests, deserts, and/or other uninhabited areas. In the case of a breakdown, a work machine 12 may require an on-site repair in such a location rather than performing the repair at, for example, a maintenance shop or roadside truck stop. Thus, a work machine breakdown may be difficult and/or expensive to repair. In addition, the repair required may be extensive for a work machine since the work machines may be exposed to relatively extreme work conditions. Accordingly, monitoring work machine operation by, for example, sensing an operating characteristic of a plurality of work machines 12, calculating a performance metric indicative of the operating characteristic of at least a portion of the plurality of work machines, and comparing the operating characteristic of at least one of the plurality of work machines to the performance metric may be advantageous in certain applications including, but not limited to, those described above.

Other embodiments of the disclosure will be apparent to those skilled in the art from consideration of the specification and practice of the disclosure disclosed herein. For example, electric current, voltage, or resistance sensors may be used to collect data. The current, voltage, or resistance data may assist in monitoring the performance characteristics of the machines 12. In addition, the data and/or signals sent by the controller 16 to the central processor 20 may also be sent to the machine 12, for example, to an operator in a cabin of the machine 12. The signals may be audible and/or visual. The alerts generated by the central processor 20 may also be communicated to the machine 12, for example, to the cabin of the machine 12. The machine 12 may include a speaker, an LED display, and/or other like device to communicate messages to the operator. In addition, the monitoring strategy of the present disclosure may also be an open-loop strategy.

It is intended that the specification and examples be considered as exemplary only, with the true scope of the disclosure being indicated by the following claims.

What is claimed is:

1. A method of monitoring machine operation, comprising:

sensing an operating characteristic of a plurality of machines;

calculating a performance metric indicative of the operating characteristic of at least two of the plurality of machines;

storing the performance metric;

comparing the performance metric to a previously calculated performance metric indicative of previously sensed operating characteristics of the same at least two of the plurality of machines; and monitoring operation of at least one of the at least two of the plurality of machines as a function of the performance metric.

2. The method of claim 1, further including determining a desired operating characteristic range in response to the calculating a performance metric.

3. The method of claim 2, further including generating an alert if the operating characteristic of the at least two of the plurality of machines is outside of the desired operating characteristic range.

4. The method of claim 2, wherein the desired operating characteristic range is based on a preset parameter.

5. The method of claim 1, wherein the previously calculated performance metric is indicative of the same operating characteristic as the performance metric.

6. The method of claim 1, wherein the operating characteristic is at least one of engine temperature, engine pressure, engine speed, fluid pressure, fluid flow rate, fluid temperature, and tool speed.

7. The method of claim 1, wherein the performance metric is an arithmetic mean.

8. The method of claim 1, further including detecting a trend in a plurality of the stored performance metrics.

9. The method of claim 8, further including displaying the trend with an operator interface.

10. A machine performance evaluation system for evaluating the performance of at least one machine in a fleet of machines, comprising:

a plurality of machines, each of the machines including:

at least one sensor configured to sense an operating characteristic of the machine, and a controller configured to accept information from the at least one sensor;

a receiver configured to receive information from the plurality of machines; and a central processor configured to receive information from more than one of the machines or the receiver, the central processor configured to:

calculate a performance metric indicative of the operating characteristic of at least two of the plurality of machines;

store the performance metric;

compare the performance metric to a previously calculated performance metric indicative of previously sensed operating characteristics of the same at least two of the plurality of machines; and evaluate the function of at least one of the at least two of the plurality of machines based on the performance metric.

11. The system of claim 10, wherein the at least one sensor is one of a temperature, pressure, flow rate, and speed sensor.

12. The system of claim 10, wherein the receiver is a satellite.

13. The system of claim 10, wherein the controller is an electronic control module.

14. The system of claim 10, further including a signal transmitter configured to communicate information sent from the at least one sensor to the receiver.

15. The system of claim 10, wherein the central processor is remote from the plurality of machines.

16. A method of monitoring machine operation, comprising:

sensing an operating characteristic of a plurality of machines;

calculating a performance metric indicative of the operating characteristic of at least two of the plurality of machines;

storing the performance metric;

comparing the performance metric to a previously calculated performance metric indicative of previously sensed operating characteristics of the same at least two of the plurality of machines; and monitoring operation of each of the plurality of machines as a function of the performance metric.

17. The method of claim 16, further including determining a desired operating characteristic range in response to the calculating a performance metric.

18. The method of claim 17, further including generating an alert if the operating characteristic of the at least two of the plurality of machines is outside of the desired operating characteristic range.

19. The method of claim 17, wherein the desired operating characteristic range is based on a preset parameter.

20. The method of claim 16, further including detecting a trend in a plurality of the stored performance metrics.

21. The method of claim 20, further including displaying the trend with an operator interface.

22. The method of claim 16, wherein the operating characteristic is at least one of engine temperature, engine pressure, engine speed, fluid pressure, fluid flow rate, fluid temperature, and tool speed.

23. The method of claim 16, wherein the performance metric is an arithmetic mean.

24. The method of claim 1, further including comparing the operating characteristic of the at least one of the at least two of the plurality of machines to the calculated performance metric.

25. The system of claim 10, wherein the central processor is configured to compare the operating characteristic of the at least one of the at least two of the plurality of machines to the calculated performance metric.

26. The method of claim 16, further including comparing the operating characteristic of each of the plurality of machines to the calculated performance metric.

* * * * *